United States Patent
Gnerlich

(10) Patent No.: US 11,994,390 B2
(45) Date of Patent: May 28, 2024

(54) VIBRATORY SENSOR WITH ELECTRONIC BALANCING

(71) Applicant: Honeywell International Inc., Charlotte, NC (US)

(72) Inventor: Markus Hans Gnerlich, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 170 days.

(21) Appl. No.: 17/668,031

(22) Filed: Feb. 9, 2022

(65) Prior Publication Data
US 2023/0251091 A1    Aug. 10, 2023

(51) Int. Cl.
*G01C 19/5712*    (2012.01)
*G01C 19/5726*    (2012.01)
*G01C 19/574*    (2012.01)

(52) U.S. Cl.
CPC ..... *G01C 19/5712* (2013.01); *G01C 19/5726* (2013.01); *G01C 19/574* (2013.01)

(58) Field of Classification Search
None
See application file for complete search history.

(56) References Cited

U.S. PATENT DOCUMENTS

| 7,444,869 B2 | 11/2008 | Johnson et al. | |
| 8,210,038 B2 | 7/2012 | Rocznik | |
| 8,266,960 B2 * | 9/2012 | Braman | G01C 21/166 73/493 |
| 8,567,248 B2 * | 10/2013 | Gotoh | G01P 15/14 73/504.15 |
| 9,631,928 B2 | 4/2017 | Rinkiö et al. | |

(Continued)

FOREIGN PATENT DOCUMENTS

| CN | 106597839 A | 4/2017 |
| CN | 110319822 A | 10/2019 |

(Continued)

OTHER PUBLICATIONS

Great Britain Intellectual Property Office, "Patents Act 1977: Search Report under Section 17(5)", from GB Application No. GB2300757.8, from Foreign Counterpart to U.S. Appl. No. 17/668,031, filed Jul. 17, 2023, pp. 1 through 3, Published: GB.

*Primary Examiner* — Kristina M Deherrera
*Assistant Examiner* — Mark A Shabman
(74) *Attorney, Agent, or Firm* — Fogg & Powers LLC

(57) ABSTRACT

A vibratory sensor with electronic balancing is provided. The vibratory sensor includes at least one pair of proof masses, at least one tunable spring having electro-thermodynamic characteristics for each first and second proof mass in the at least one pair of proof masses, and a steering circuit. Each pair of proof masses include a first proof mass and a second proof mass. The first proof mass and the second proof mass can move in opposing directions. Each tunable spring couples an associated one of the first and second proof masses to a substrate. The steering circuit is configured to selectively couple current from a power source to each tunable spring to adjust the stiffness of at least one tunable spring to balance relative movement between the first and second proof masses of the at least one pair of proof masses.

20 Claims, 6 Drawing Sheets

(56) References Cited

U.S. PATENT DOCUMENTS

| | | | |
|---|---|---|---|
| 2004/0177689 A1* | 9/2004 | Cho | G01C 19/5719 |
| | | | 73/504.14 |
| 2004/0199347 A1* | 10/2004 | Painter | G01C 19/56 |
| | | | 702/92 |
| 2010/0257932 A1* | 10/2010 | Braman | G01P 1/023 |
| | | | 73/493 |
| 2010/0300203 A1* | 12/2010 | Gotoh | G01P 15/14 |
| | | | 73/504.15 |
| 2014/0260615 A1* | 9/2014 | Simon | H03H 9/2468 |
| | | | 310/300 |
| 2015/0316378 A1 | 11/2015 | Kergueris et al. | |
| 2017/0108529 A1* | 4/2017 | Zhang | G01P 15/18 |
| 2018/0019639 A1* | 1/2018 | Yang | F16F 15/03 |
| 2019/0055116 A1* | 2/2019 | Shirvani | H03H 3/0075 |
| 2020/0011666 A1 | 1/2020 | Golnaraghi et al. | |
| 2020/0099357 A1 | 3/2020 | Liukku | |
| 2020/0369513 A1 | 11/2020 | Hennes et al. | |

FOREIGN PATENT DOCUMENTS

| | | |
|---|---|---|
| WO | 2009057990 A2 | 5/2009 |
| WO | 2016205770 A1 | 12/2016 |

\* cited by examiner

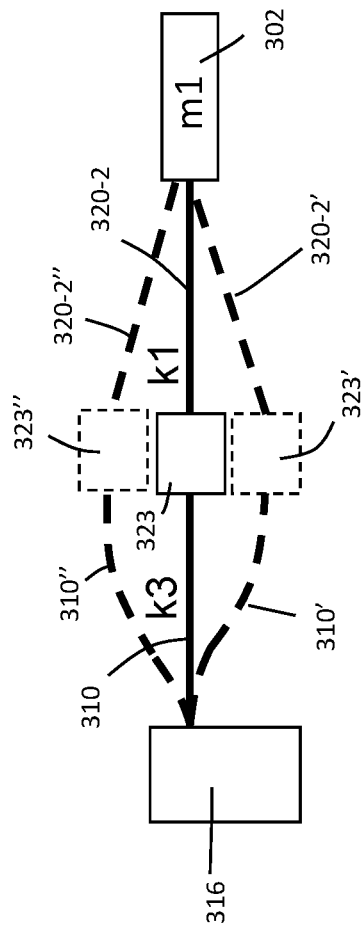

VIBRATORY SENSOR WITH ELECTRONIC BALANCING

BACKGROUND

Vibratory sensors such as micro electro-mechanical system (MEMS) sensors combine electrical and mechanical components into or on top of a single chip. A MEMS gyroscope (angular rate sensors) may be used to determine a rate of rotation without needing a fixed point of reference. The measurement of rotation (angular velocity and angular acceleration) is critical for several classes of applications. The first class relates to the determination of the position, orientation, and motion of an object. Examples include inertial navigation of a vehicle (the object's position) as well as gyro-compassing and up-finding (the object's orientation). The second class relates to the control of motion of an object through feedback mechanisms. An example includes the use of inertial sensors (which includes MEMS sensors) in combination with control surfaces of a flying vehicle to maintain a trajectory or execute a maneuver. Other example systems that must be controlled to maintain a constant orientation and smoothly move between orientations include platforms such as oil rigs, camera mounts and telescopes.

One technical approach for a vibrating MEMS gyroscope uses a movable structure that includes at least a pair of opposing proof masses that experience a Coriolis force during an externally applied rotation. This may be referred to as a "tuning fork" assembly, and the performance limit of vibratory MEMS gyroscopes of this type depends in part on equal and opposite forces between opposing proof masses. However, imperfections during manufacturing can cause this balance to be imperfect therein reducing the performance limit of inertial sensors incorporating vibratory MEMS gyroscopes. For example, an imperfect balance can result in undesirable cross-talk between MEMS gyroscopes used in an inertial measurement unit (IMU) assembly.

SUMMARY OF INVENTION

The following summary is made by way of example and not by way of limitation. It is merely provided to aid the reader in understanding some of the aspects of the subject matter described. Embodiments provide a system to balance a vibratory sensor.

In one embodiment, a vibratory sensor with electronic balancing is provided. The MEMS sensor includes at least one pair of proof masses, at least one tunable spring having electro-thermodynamic characteristics for each first and second proof mass in the at least one pair of proof masses, and a steering circuit. Each pair of proof masses include a first proof mass and a second proof mass. The first proof mass and the second proof mass are able to move in opposing directions. Each tunable spring couples an associated one of the first and second proof masses to a substrate. The steering circuit is configured to selectively couple current from a power supply to each tunable spring to adjust the stiffness of at least one tunable spring to balance relative movement between the first and second proof masses of the at least one pair of proof masses.

In another embodiment, a vibratory micro electro-mechanical system (MEMS) gyroscope with electronic balancing is provided. The gyroscope includes a tuning fork assembly, at least one sensor, a power supply and a steering circuit. The tuning fork assembly includes at least one pair of proof masses, a plurality of springs coupling each proof mass of the at least one pair of proof masses to a substrate, and at least one tunable spring having electro-thermodynamic characteristics coupled in series with one spring of the plurality of springs. Each pair of proof masses includes a first proof mass and a second proof mass. The first proof mass and the second proof mass are able to move in opposing directions. The at least one sensor is configured to sense vibrations generated by the tuning fork assembly. The steering circuit is configured to selectively couple current from the power supply to each tunable spring to adjust the stiffness of at least one tunable spring to balance relative movement between the first and second proof masses of the at least one pair of proof masses based on an output of the at least one sensor.

In yet another embodiment, a method of balancing a vibratory sensor is provided. The method includes sensing vibrations generated by a tuning fork assembly of the vibratory sensor; determining if the tuning fork assembly is out of balance based on the sensed vibrations; and when it is determined that the tuning fork assembly is out of balance, adjusting a stiffness of at least one tunable spring that couples at least one proof mass of the tuning fork assembly to a substrate.

BRIEF DESCRIPTION OF THE DRAWINGS

The present invention can be more easily understood and further advantages and uses thereof will be more readily apparent, when considered in view of the detailed description and the following figures in which:

FIG. 3B is an illustration of a side view of a portion of the simple fork assembly of FIG. 3A.

In accordance with common practice, the various described features are not drawn to scale but are drawn to emphasize specific features relevant to the present invention. Reference characters denote like elements throughout Figures and text.

DETAILED DESCRIPTION

Figure 1:
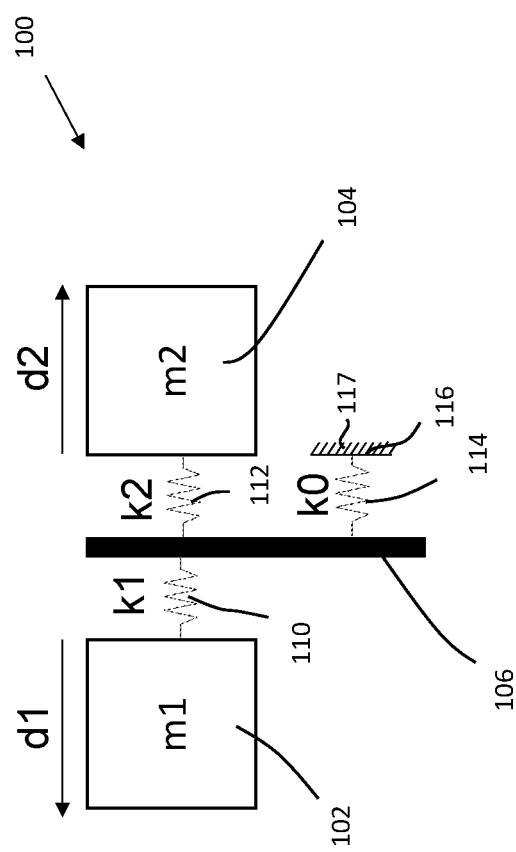
FIG. 1 is a free body illustration of a simple tuning fork assembly of the prior art.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a vibratory sensor with electronic balancing. An example of a vibratory sensor is a vibratory gyroscope. Further, an example of vibratory gyroscope is a vibratory MEMS gyroscope. As discussed above, manufacturing defects can cause an unbalance of a tuning fork assembly of a vibratory sensor such as a vibratory MEMS gyroscope. Embodiments employ at least one tunable spring with an electronically tunable stiffness to restore the balance post-manufacturing.

In one example, the tunable spring is made of a doped silicon. The doped silicon is conductive and heats up when an electrical current is passed through it. The change to spring stiffness upon heating is a mechanical effect of the spring's geometry and is dependent on the material coefficient of thermal expansion. In another example, temperature dependency of the material's elastic modulus is used to produce a change in spring stiffness.

Embodiments may be applied to any vibratory sensor, such as a vibratory MEMS gyroscope with opposing masses in motion, including 2-mass tuning fork out-of-plane gyroscopes (OPG), 2-mass tuning fork in-plane gyroscopes (IPG), 4-mass OPG, 2-mass box-in-frame OPG, etc. Selectively balancing the tuning fork assembly of a MEMS gyroscope remedies a predominant error mechanism that limits bias performance occurring in vibratory MEMS gyroscopes. Further embodiments also suppress cross-talk between vibratory gyroscopes mounted together in a cluster, therein providing cost benefits and a simplified IMU assembly.

In embodiments, at least one proof mass from a pair of proof masses is partially supported by a tunable spring. In one embodiment the tunable spring is a doubly-clamped tunable spring that is constrained at both ends by anchor points and is heated electrically. Heating allows the unattached free-standing portion of the tunable spring to develop an elevated temperature compared to the anchor point. When heated, the free-standing portion of the tunable spring expands within the mechanical constraints of the anchor points therein lowering the net tension on the doubly-clamped beam. The tunable spring is attached to at least one of a first and a second proof mass in a tuning fork design. The at least one tunable spring is adjusted to correct for a net imbalance in overall tuning fork spring stiffness which may be due to non-ideal fabrication. In an example where each proof mass is attached to a tunable spring, each tunable spring may be independently adjusted to correct for a net first or second imbalance in overall tuning fork spring stiffness.

For further background, FIG. 1 illustrates a free body diagram of a simple tuning fork assembly 100 of a MEMS gyroscope that includes a first mass 102 (m1) and a second mass 104 (m2). Springs 110 (k1) and 112 (k2) couple the respective masses 102 and 104 to a tuning fork member 106 that is free to move. Spring 114 (k0) in this example, is coupled between the tuning fork member 106 and supporting substrate portion 116 of a substrate 117. The tuning fork motion is illustrated with displacements d1 and d2 in equal and opposite directions. In the case where stiffness of spring 110 is not equal to the stiffness of spring 112 or the mass of the first mass 102 is not equal to the mass of the second mass 104, then a small displacement would affect spring 114 resulting in a net force on the supporting substrate portion 116 of a substrate 117. Example embodiments monitor the substrate to determine if there is an imbalance in the tuning fork assembly 100. An imbalance may, among other issues, cause undesirable crosstalk between MEMS sensors in an IMU sensor assembly.

Figure 2:
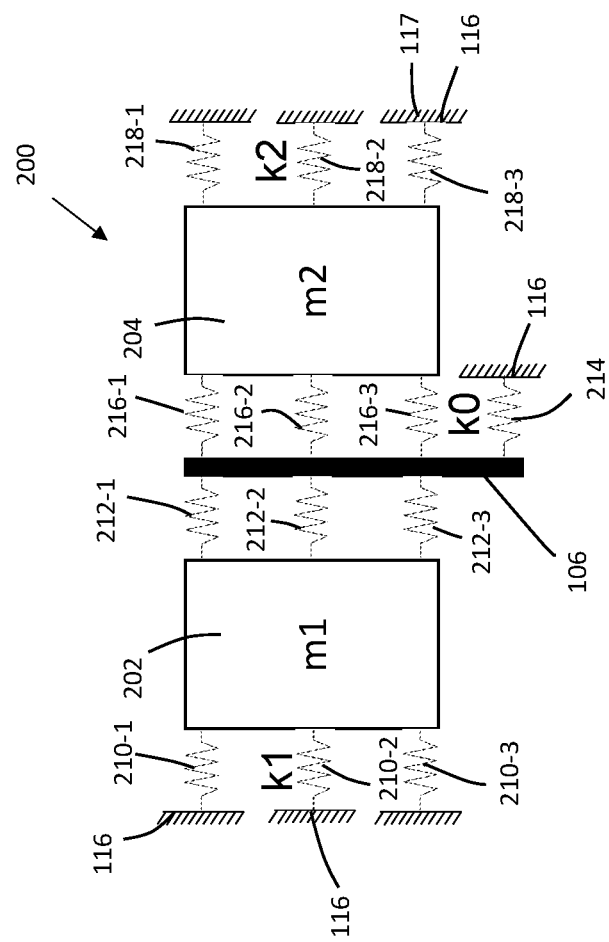
FIG. 2 is another illustration of a free body of a simple tuning fork assembly of the prior art.

In a MEMS sensor, the proof masses 102 and 104 that form a tuning fork design may be supported by multiple springs acting in tandem as illustrated in the tuning fork assembly 200 of FIG. 2. In this example, proof mass 202 (m1) is coupled to supporting substrate portions 116 via springs 210-1, 210-2, 210-3 and tuning fork member 106 via springs 212-1, 212-2, 212-3. Proof mass 204 (m2) is coupled to supporting substrate portions 116 via springs 218-1, 218-2, 218-3 and tuning fork member 106 via springs 216-1, 216-2, 216-3. Spring 214 (k) is coupled between the tuning fork member 106 and the supporting substrate portion 116 of the substrate 117. In the case where the stiffness of springs 210-1, 210-2 and 210-3 are not equal to the stiffness of springs 218-1, 218-2 and 218-3 or the stiffness of springs 212-1, 212-2 and 212-3 are not equal to the stiffness of springs 216-1, 216-2 and 216-3 or the mass of the first proof mass 202 is not equal to the mass of the second proof mass 204, a small displacement would affect spring 214 resulting an undesirable net force on the supporting substrate portions 116.

Figure 3A:
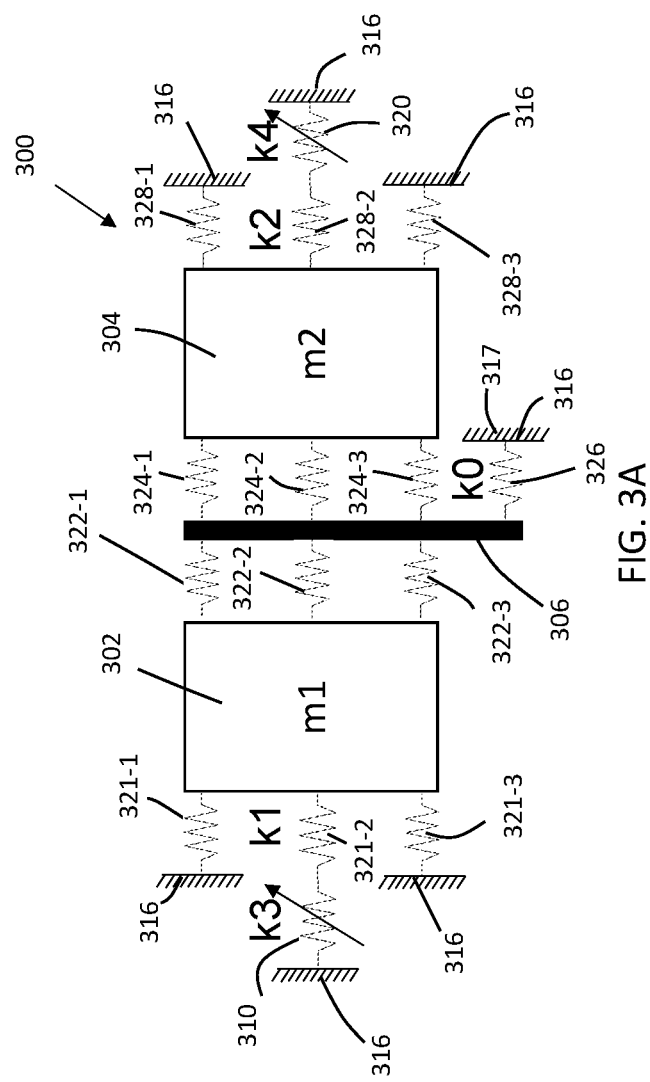
FIG. 3A is an illustration of a free body of a simple tuning fork assembly according to an exemplary embodiment of the present application.

FIG. 3A illustrates an example embodiment that uses tunable springs 310 (k3) and 320 (k4) to correct any imbalance in the tuning fork assembly 300 of a vibratory sensor. The tuning fork assembly 300 includes springs 321-1, 321-2 and 321-3. Springs 321-1 and 321-3 couple a first proof mass 302 (m1) to supporting substrate portions 316 of a substrate 317. Spring 321-2 (k1) couples the first proof mass 302 to a tunable spring 310 (stiffness adjustable spring). The tunable spring 310 is further coupled to a supporting substrate portion 316. The first proof mass 302 is coupled to a tuning fork member 306 via springs 322-1, 322-2 and 322-3.

The tuning fork assembly 300 of the vibratory sensor includes springs 328-1, 328-2 and 328-3. Springs 328-1 and 328-3 couple a second proof mass 304 (m2) to the supporting substrate portion 316. Spring 328-2 (k2) couples the second proof mass 304 to a tunable spring 320. The tunable spring 320 is further coupled to a supporting substrate portion 316. The second proof mass 302 in this example is coupled to tuning fork member 306 via springs 324-1, 324-2 and 324-3. Also illustrated in this example is spring 326 (k0) coupled between the tuning fork member 306 and a supporting substrate portion 316 of the substrate. Any imbalance will cause a force on spring 326.

In this example, the stiffness of one or both of the tunable springs 310 and 320 may be adjusted to counteract the effect of having an unbalance in the net stiffness of springs supporting the first mass 302 and the second mass 304, or a difference in mass between the first mass 302 and the second mass 304. As illustrated, the tunable springs 310 and 320 are in a series configuration with respective spring 321-2 and 328-2. In an example, the tunable springs 310 and 320 have electro-thermal properties so that when a current is passed through their structure, the stiffness of the tunable springs 310 and 320 decrease as the current increases. An imbalance in the tuning fork assembly 300 of a vibratory sensor may be detected by monitoring an amplitude and phase of the vibration of the substrate which occurs at the resonant frequency of the tuning fork assembly. The amplitude is proportional to the magnitude of the imbalance. The phase is used by a steering circuit in adjusting the tunable spring 310 or 320 to correct the imbalance. The stiffness of one or both the tunable springs 310 and 320 may be adjusted to reduce the vibration bringing the tuning fork assembly into balance.

Referring to FIG. 3B, a side view illustrating connections of the tunable spring 310 and spring 321-2 in an example is provided. As illustrated, a first side of the tunable spring 310 is attached to a fixed anchor which is the supporting substrate portion 316. A second end of the tunable spring 310 is attached to an attach point 323. The tunable spring 310 may include a pair of parallel members, such as a doubly-clamped beam, in an example. A first end of spring 321-2 is coupled to an opposite side of the attach point 323. As second end of the spring 321-2 is coupled to mass 302. When a current is passed through the tunable spring 310 the tunable spring 310 becomes more compliant as graphically illustrated by the positioning of the tunable spring 310', the attach point 323' and spring 321-2' in a first direction or the tunable spring 310", the attach point 323" and spring 321-2" in a second direction in FIG. 3B.

In one example doubly-clamped beam embodiment of the tunable spring 310, a preloaded tension is formed with a fabrication process that uses glass and silicon wafers that are anodically bonded together at high temperatures. This process provides the pre-loaded tension in the doubly-clamped beam at normal operating temperatures. Warming up the tunable spring 310 causes the silicon to expand and lower tension therein making the tunable spring 310 more pliable. In another example, a doubly-clamped beam embodiment of a tunable spring 310 is formed without a pre-load. In this example, the doubly-clamped beam becomes bistable when heated. When the adjacent spring 320-2 has sufficient displacement to cause the doubly-clamped beam (tunable spring 310) to travel though it's bistable points, the net overall stiffness is changed.

Figure 4:
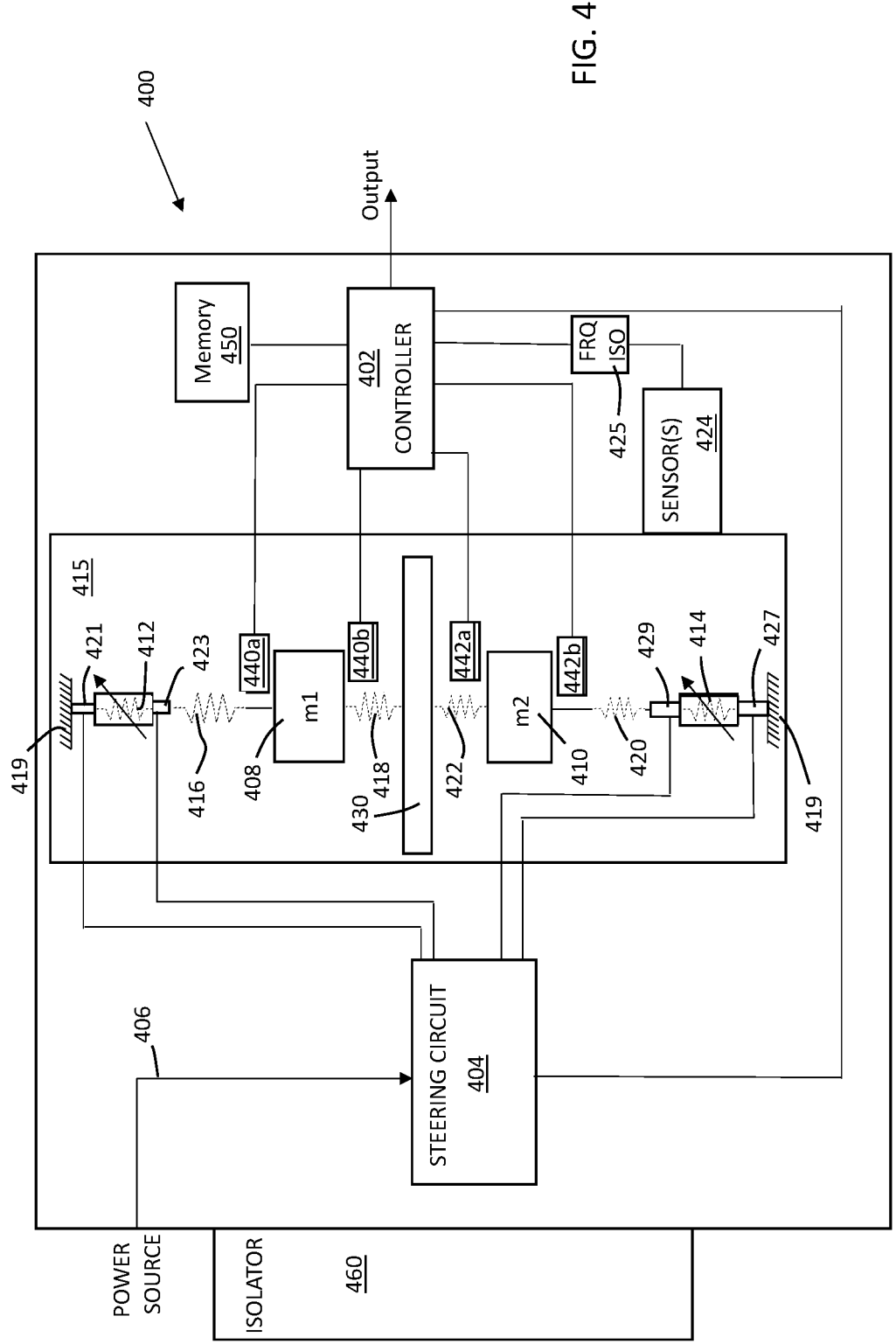
FIG. 4 is a block diagram of vibratory MEMS gyroscope according to an exemplary embodiment of the present application.

Referring to FIG. 4, a block diagram of an example vibratory sensor with electronic balancing, which is a vibratory MEMS gyroscope 400 in this example, is illustrated. The gyroscope 400 includes a tuning fork assembly 415. The tuning fork assembly 415 in this example includes a first proof mass 408 (m1) and a second proof mass 410 (m2). The first proof mass 408 is coupled to spring 418 and the first tunable spring 412 via spring 416. Another end of spring 418 is coupled to a substrate portion 430. The first tunable spring 412 is coupled to a first anchor point 421 and a first attach point 423. Anchor point 421 is coupled to the substrate 419 while the attach point 423 is not coupled to the substrate 419 and is therefore able to move in relation to the substrate 419. Spring 416 is further coupled to the movable attach point 423.

The second proof mass 410 (m2) of the tuning fork assembly 415 is coupled to spring 422 and the second tunable spring 414 via spring 420. Another end of spring 422 is coupled the substrate portion 430. The second tunable spring 414 is coupled to a second anchor point 427 and a second attach point 429. The second anchor point 427 is coupled to the substrate 419 while the attach anchor point 429 is not coupled to the substrate 419 and is therefore able to move in relation to the substrate 419. Spring 420 is further coupled to the movable attach point 429.

Movement of the first proof mass 408 is detected by pick-off sensors 440a and 440b and movement of the second proof mass 410 is detected by pick-off sensors 442a and 442b. An example of a type of pick-off used to detect movement is a capacitive plate transducer. Various configurations using capacitive pick-offs may be used. As known in the art, an acceleration or force applied along a sensitive axis causes the proof of mass to deflect, causing a distance (e.g., a capacitive gap between the capacitive pick-offs) to vary. This variance in the capacitive gap causes a change in capacitance which is representative of the displacement of the proof mass along the sensitive axis, and the sensitive axis may be oriented in any direction as determined by the construction of the transducer. The change in capacitance may be indicated by a current (signal). Other types of pick-off sensors may be used to measure the displacement of the proof masses 408 and 410. The other types of pick-off sensors include, but are not limited to, piezoelectric, piezoresistive, optical, magnetic, etc.

The vibratory MEMS gyroscope 400 further includes a controller 402 that is in communication with sensor(s) 424 and a memory 450 to at least store operating instructions. In general, the controller 402 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller 402 herein may be embodied as software, firmware, hardware or any combination thereof. The controller 402 may be part of a system controller or a component controller. The memory 450 may include computer-readable operating instructions that, when executed by the controller 402 provides functions of the vibratory MEMS gyroscope 400 with electronic balancing. Such functions may include the functions of adjusting the stiffness of springs 412 and 414 to achieve a balanced tuning fork system. The computer readable instructions may be encoded within the memory 450. Memory 450 is an appropriate non-transitory storage medium or media including any volatile, nonvolatile, magnetic, optical, or electrical media, such as, but not limited to, a random-access memory (RAM), read-only memory (ROM), non-volatile RAM (NVRAM), electrically erasable programmable ROM (EEPROM), flash memory, or any other storage medium.

The controller 402 in this example is in communication with the pick-off sensors 440a, 440b, 442a and 442b. The controller 402 uses outputs from the pick-off sensors 440a, 440b, 442a and 442b in generating an output of the gyroscope 400. The controller 402 is also in communication with at least one vibration sensor 424. The vibration sensor 424 is configured to detect frequency and phase of vibrations in the tuning fork assembly 415 of the gyroscope 400. The sensor(s) 424 may be mounted on the substrate, an integrated circuit board that may include the controller 402, steering circuit 404, memory 450, etc. and a cover of the vibratory MEMS gyroscope 400.

In one example, a frequency isolation device 425 is used to isolate vibrations detected at the resonance frequency of the tuning fork assembly 415 to determine if the tuning fork assembly 415 is imbalanced. Examples of a frequency isolation device include, but is not limited to, a band pass filter and a lock-in filter. In the lock-in amplifier example of the frequency isolation device 425, the lock-in amplifier extracts a signal at a set frequency from what can be an extremely noisy environment. In one example embodiment, the lock-amplifier is achieved with high performance digital signal processing (DSP). Further in an example, the DSP is performed by the controller 402.

The controller 402, based on the output of sensor 424, controls a steering circuit 404, to selectively couple current, from an output 406 of a power source, across at least one of the first and second tunable springs 412 and 414 when the output of the sensor 424 indicates the tuning fork assembly 415 is imbalanced. In one example, the steering circuit 404 is part of the controller 402. In one example the controller 402 forms, in part, a proportional integral derivative (PID) control loop. The input to the PID control loop is generated from both the amplitude and phase of the vibration detected by sensors 424 relative to motor pick-off.

Vibrations due to the tuning fork assembly 415 imbalance radiates or leaks out of a package of the vibratory MEMS gyroscope 400 as acoustic energy. When the imbalance is minimized, the external observable radiated acoustic energy is also minimized. Since the frequency in which the tuning fork assembly 415 resonates is known, monitoring for the detection in narrow band at that frequency may be used. The acoustic energy may be detected, for example, by a microphone, accelerometer, or piezo film.

One example of a sensor(s) 424 used to monitor the vibrations of the tuning fork assembly 415 includes an accelerometer, such as but not limited to, a single-axis calibrated accelerometer based on a piezo transducer. Other examples include a contact microphone and a compact piezo transducer element. The sensor(s) 424 may be positioned to monitor vibrations of the substrate 419 in which the tuning fork assembly 415 is connected. In one example, the compact piezo transducer element is mounted on a lid (not shown) of the vibratory MEMS gyroscope 400. In another example, the capacitive pick-off sensors 440a, 440b, 442a and 442b and controller 402 are designed to monitor the vibration caused by an imbalance in the tuning fork assembly 415.

Figure 5:
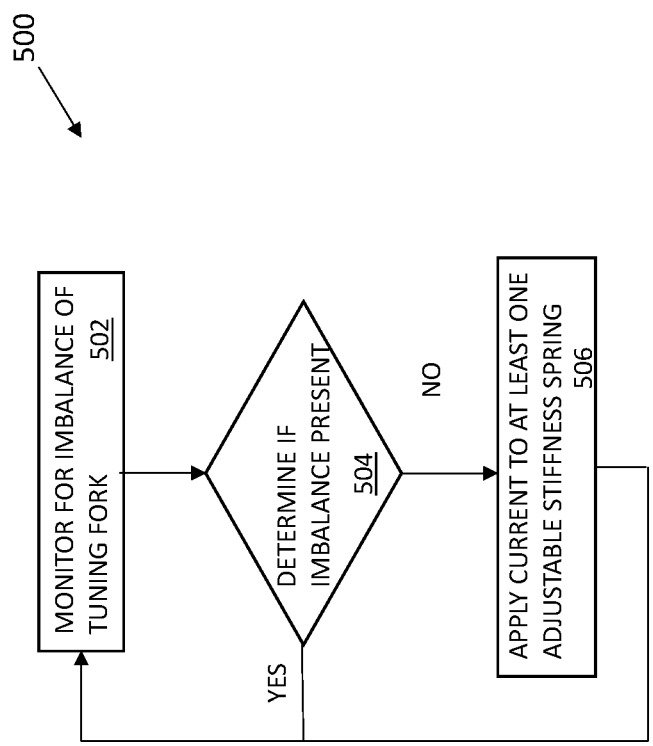
FIG. 5 is a balancing flow diagram according to an exemplary embodiment of the present application.

FIG. 5 illustrates a balancing flow diagram 500 of one example. The balancing flow diagram 500 is provided as a series of sequential blocks. The sequence of the blocks may be in a different order or even run in parallel in other examples. Hence, embodiments are not limited to the block sequence set out in FIG. 5. In the example of FIG. 5, the tuning fork is monitored at block 502. As discussed above, some embodiments only monitor the resonance frequency in which the vibratory MEMS gyroscope 400, or tuning fork assembly 415 of the vibratory MEMS gyroscope vibrates. For example, if the resonant frequency of the tuning fork assembly 415 is 10 kHz, only that frequency needs to be observed. Also being monitored is the phase of the vibration relative to the capacitance pick-offs in an example embodiment. Observing the phase of the vibration reveals which side of the tuning fork has the greater imbalance and hence which spring to direct the current to with the steering circuit.

It is then determined at block 504 if an imbalance in the tuning fork assembly 415 is detected. If an imbalance is not detected at block 504, the process continues monitoring at block 502. In other example, once it is determined that an imbalance is not present, the process stops monitoring for at least a period of time. In another example, once it is determined that an imbalance is not present, the process stops monitoring for an imbalance.

If it is determined that an imbalance is detected at block 504, current is applied to at least one of the tunable springs 412 and 414 at block 506. In one example, this is done with the PID control loop implemented by the controller 402. The input to the PID control loop is generated from amplitude and phase of the vibration relative to motor pick-off. The output of the control loop is a control voltage to the steering circuit 404. The steering circuit 404 may include a pair of precision rectifiers each followed by a differential outputs stage. This approach converts a continuously varying control voltage from the controller 402 into current for either 412 (negative control voltage) or 414 (positive control voltage), and the magnitude of current is proportional to magnitude of control voltage.

The process then continues at block 502 monitoring for an imbalance in the tuning fork assembly 415. In one example, the process continues trying different currents on different tunable springs until a balance is reached. Once a balance is reached, the currents used in the tunable springs may be stored in the memory 450 so that can be applied upon a next power up of the vibratory MEMS gyroscope.

Further in one example, the sensor 424 monitors the vibration frequency of the substrate 419 continuously while the vibratory MEMS gyroscope 400 is activated. As discussed above, monitoring only needs to occur at the resonant frequency. The resonant frequency is typically higher than any frequency spectral content in angular rotation that the MEMS gyroscope can measure. Therefore, interference between the frequencies is unlikely. For example, a vehicles angular acceleration rate is expected in a bandwidth of the vibratory MEMS gyroscope 400 to be about 1 kHz max. Since a Coriolis force on the proof masses due to angular rotation is related to the product of the angular rotation and the proof mass velocity, the motion of the proof masses is occurring at frequencies between 10 kHz+0 kHz and 10 kHz+1 kHz in this example. The proof mass motion is demodulated at 10 kHz, revealing the angular rotation at 0-1 kHz. Hence, for the example having a resonant frequency of around 10 kHz, there is no interference in determining vibration due to an imbalance and angular acceleration. Further, if there is a real periodic oscillation in the environment at 10 kHz, such as an oscillation from an engine, a damped mechanical isolator 460 (illustrated in FIG. 4) may be positioned between the chassis of vehicle and the vibratory MEMS gyroscope 400. The isolator 460 will have a roll-off frequency below the MEMS gyroscope vibration frequency but above the rotation rate bandwidth.

EXAMPLE EMBODIMENTS

Example 1 includes a vibratory sensor with electronic balancing. The vibratory sensor includes at least one pair of proof masses, at least one tunable spring having electrothermodynamic characteristics for each first and second proof mass in the at least one pair of proof masses, and steering circuit. Each pair of proof masses include a first proof mass and a second proof mass. The first proof mass and the second proof mass can move in opposing directions. Each tunable spring couples an associated one of the first and second proof masses to a substrate. The steering circuit is configured to selectively couple current from the power source to each tunable spring to adjust the stiffness of at least one tunable spring to balance relative movement between the first and second proof masses of the at least one pair of proof masses.

Example 2 includes the vibratory sensor of Example 1, wherein at least one of the tunable springs is a doubly-clamped beam.

Example 3 includes the vibratory sensor of any of the Examples 1-2, further including at least one spring that is coupled in series with the at least one tunable spring.

Example 4 includes the vibratory sensor of any of the Examples 1-3, further including at least one vibration sensor to monitor an imbalance between the first and second proof masses of the at least one pair of proof masses. The steering circuit in communication with the at least one vibration sensor.

Example 5 includes the vibratory sensor of Example 4, wherein the at least one vibration sensor is a single-axis calibrated accelerometer.

Example 6 includes the vibratory sensor of Example 5, wherein the single-axis calibrated accelerometer is based on a piezo transducer and is configured to monitor the vibration of the substrate.

Example 7 includes the vibratory sensor of Example 4, wherein the at least one vibration sensor is at least one of a contact microphone and piezo transducer element.

Example 8 includes the vibratory sensor of Example 4, wherein the at least one vibration sensor is mounted on one of a cover of the vibratory sensor, the substrate and an integrated circuit.

Example 9 includes the vibratory sensor of Example 4, further including a frequency isolation device to isolate frequencies of an output of the at least one vibration sensor to a resonant frequency of the vibratory sensor.

Example 10 includes a vibratory micro electro-mechanical system (MEMS) gyroscope with electronic balancing. The gyroscope includes a tuning fork assembly, at least one sensor, and a steering circuit. The tuning fork assembly includes at least one pair of proof masses, a plurality of springs coupling each proof mass of the at least one pair of proof masses to a substrate, and at least one tunable spring having electro-thermodynamic characteristics coupled in series with one spring of the plurality of springs. Each pair of proof masses includes a first proof mass and a second proof mass. The first proof mass and the second proof mass are able to move in opposing directions. The at least one sensor is configured to sense vibrations generated by the tuning fork assembly. The steering circuit is configured to selectively couple current from a power supply to each tunable spring to adjust the stiffness of at least one tunable spring to balance relative movement between the first and second proof masses of the at least one pair of proof masses based on an output of the at least one sensor.

Example 11 includes the gyroscope of Example 10, wherein the at least one tunable spring is a doubly-clamped beam. The doubly-clamped beam is coupled between a first anchor point and a second anchor point. The first anchor point is coupled to the substrate while the second anchor point is free to move in relation to the substrate.

Example 12 includes the gyroscope of any of the Examples 10-11, wherein the at least one sensor is at least one of an accelerometer, a contact microphone and a compact piezo transducer element.

Example 13 includes the gyroscope of any of the Examples 10-12, further including a memory to at least store operating instruction and a controller. The controller is in communication with the at least one sensor. The controller is configured to control the steering circuit to selectively couple current to each tunable spring based on the output of the at least one sensor and the operating instructions stored in the memory to balance the relative movement between the first and second proof masses of the at least one pair of proof masses.

Example 14 includes the gyroscope of Example 14, wherein the controller is configured to store current levels that achieve the balance in the memory.

Example 15 includes the gyroscope of any of the Examples 10-14, further including a damped isolator that is positioned between the gyroscope and a vehicle that contains the gyroscope to isolate vibrations from the gyroscope from vibrations caused by a vehicle component.

Example 16 includes the gyroscope of any of the claims 10-15, further including a frequency isolation device to isolate frequencies of an output of the at least one sensor to a resonant frequency of the tuning fork assembly of the gyroscope.

Example 17 includes a method of balancing a vibratory micro sensor, the method includes sensing vibrations generated by a tuning fork assembly of the gyroscope; determining if the tuning fork assembly is out of balance based on the sensed vibrations; and when it is determined that the tuning fork assembly is out of balance, adjusting a stiffness of at least one tunable spring that couples at least one proof mass of the tuning fork assembly to a substrate.

Example 18 includes the method of Example 17, further including isolating the sensed vibrations to a resonance frequency of the tuning fork assembly.

Example 19 includes the method of any of the Examples 17-18, wherein adjusting the stiffness of the at least one tunable spring further includes coupling a current through the at least one tunable spring to heat up the at least one tunable spring.

Example 20 includes the method of any of the examples 17-19, wherein the tunable spring is a doubly-clamped beam.

Although specific embodiments have been illustrated and described herein, it will be appreciated by those of ordinary skill in the art that any assembly, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vibratory sensor with electronic balancing, the vibratory sensor comprising:
   a substrate:
   at least one pair of proof masses, each pair of proof masses including a first proof mass and a second proof mass, the first proof mass and the second proof mass able to move in opposing directions;
   at least one tunable spring having electro-thermodynamic characteristics for each first and second proof mass in the at least one pair of proof masses, each tunable spring coupling an associated one of the first and second proof masses to the substrate; and
   a steering circuit configured to selectively couple current from a power source to each tunable spring to adjust a stiffness of at least one tunable spring based on the electro-thermodynamic characteristics of the at least one tunable spring to balance relative movement between the first and second proof masses of the at least one pair of proof masses.

2. The vibratory sensor of claim 1, wherein at least one of the tunable springs is a doubly-clamped beam.

3. The vibratory sensor of claim 1, further comprising:
   at least one spring coupled in series with the at least one tunable spring.

4. The vibratory sensor of claim 1, further comprising:
   at least one vibration sensor to monitor an imbalance between the first and second proof masses of the at least one pair of proof masses, the steering circuit in communication with the at least one vibration sensor.

5. The vibratory sensor of claim 4, wherein the at least one vibration sensor is at least one of a contact microphone and piezo transducer element.

6. The vibratory sensor of claim 4, wherein the at least one vibration sensor is mounted on one of a cover of the vibratory sensor, the substrate and a printed circuit board.

7. The vibratory sensor of claim 4, further comprising:
   a frequency isolation device to isolate frequencies of an output of the at least one vibration sensor to a resonant frequency of the vibratory sensor.

8. The vibratory sensor of claim 1, wherein the at least one vibration sensor is a single-axis calibrated accelerometer.

9. The vibratory sensor of claim 8, wherein the single-axis calibrated accelerometer is based on a piezo transducer and is configured to monitor a vibration of the substrate.

10. A vibratory micro electro-mechanical system (MEMS) gyroscope with electronic balancing, the gyroscope comprising:
a tuning fork assembly including,
at least one pair of proof masses, each pair of proof masses including a first proof mass and a second proof mass, the first proof mass and the second proof mass able to move in opposing directions,
a plurality of springs coupling each proof mass of the at least one pair of proof masses to a substrate, and
at least one tunable spring having electro-thermodynamic characteristics coupled in series with one spring of the plurality of springs;
at least one sensor configured to sense vibrations generated by the tuning fork assembly; and
a steering circuit configured to selectively couple current from a power supply to each tunable spring to adjust a stiffness of at least one tunable spring based on the electro-thermodynamic characteristics of the at least one tunable spring to balance relative movement between the first and second proof masses of the at least one pair of proof masses based on an output of the at least one sensor.

11. The gyroscope of claim 10, wherein the at least one tunable spring is a doubly-clamped beam, the doubly-clamped beam coupled between a first anchor point and a second anchor point, the first anchor point coupled to the substrate while the second anchor point is free to move in relation to the substrate.

12. The gyroscope of claim 10, wherein the at least one sensor is at least one of an accelerometer, a contact microphone and a compact piezo transducer element.

13. The gyroscope of claim 10, further comprising:
a memory to at least store operating instructions; and
a controller in communication with the at least one sensor, the controller configured to control the steering circuit to selectively couple current to each tunable spring based on the output of the at least one sensor and the operating instructions stored in the memory to balance the relative movement between the first and second proof masses of the at least one pair of proof masses.

14. The gyroscope of claim 13, wherein the controller is configured to store, in the memory, current levels that achieve the balance.

15. The gyroscope of claim 10, further comprising:
a damped isolator positioned between the gyroscope and a vehicle that contains the gyroscope to isolate vibrations from the gyroscope from vibrations caused by a vehicle component.

16. The gyroscope of claim 10, further comprising:
a frequency isolation device to isolate frequencies of an output of the at least one sensor to a resonant frequency of the tuning fork assembly of the gyroscope.

17. A method of balancing a vibratory sensor, the method comprising:
sensing vibrations generated by a tuning fork assembly of the vibratory sensor;
determining if the tuning fork assembly is out of balance based on the sensed vibrations; and
when it is determined that the tuning fork assembly is out of balance, adjusting a stiffness of at least one tunable spring that couples at least one proof mass of the tuning fork assembly to a substrate based on electro-thermodynamic characteristics of the at least one tunable spring.

18. The method of claim 17, further comprising:
isolating the sensed vibrations to a resonance frequency of the tuning fork assembly.

19. The method of claim 17, wherein adjusting the stiffness of the at least one tunable spring further comprises:
coupling a current through the at least one tunable spring to heat up the at least one tunable spring.

20. The method of claim 17, wherein the tunable spring is a doubly-clamped beam.

* * * * *